(12) United States Patent
Chen et al.

(10) Patent No.: US 6,668,105 B2
(45) Date of Patent: Dec. 23, 2003

(54) FIBER OPTIC STRAIN SENSOR

(75) Inventors: Peter C. Chen, Arlington, VA (US); Shiping Chen, Rockville, MD (US)

(73) Assignee: Systems Planning & Analysis, Inc., Greenbelt, MD (US)

( * ) Notice: Subject to any disclaimer, the term of this patent is extended or adjusted under 35 U.S.C. 154(b) by 160 days.

(21) Appl. No.: 09/912,600

(22) Filed: Jul. 26, 2001

(65) Prior Publication Data

US 2002/0028034 A1 Mar. 7, 2002

Related U.S. Application Data (60) Provisional application No. 60/221,208, filed on Jul. 27, 2000.

(51) Int. Cl.[7] ............................................. G02B 6/00
(52) U.S. Cl. ............................ 385/13; 385/12; 385/37; 356/35.5
(58) Field of Search ......................... 385/12, 13, 10, 385/37; 250/227.14, 227.16; 356/35.5

(56) References Cited

U.S. PATENT DOCUMENTS

| | | | | |
|---|---|---|---|---|
| 4,724,316 | A | * | 2/1988 | Morton .................. 250/227.14 |
| 4,806,012 | A | * | 2/1989 | Meltz et al. ................... 356/32 |
| 5,394,488 | A | * | 2/1995 | Fernald et al. ................ 385/13 |
| 5,892,582 | A | * | 4/1999 | Bao et al. ..................... 356/519 |
| 6,125,216 | A | * | 9/2000 | Haran et al. .................. 385/12 |
| 6,233,746 | B1 | * | 5/2001 | Skinner ................. 250/227.18 |
| 6,335,524 | B1 | * | 1/2002 | Udd et al. ............. 250/227.18 |
| 6,374,014 | B1 | * | 4/2002 | Jablonski ..................... 385/37 |
| 6,490,931 | B1 | * | 12/2002 | Fernald et al. ................. 73/705 |

OTHER PUBLICATIONS

"Review of Fibre Sensor Techniques for Temperature–Strain Discrimination", Julian D.C. Jones, Heriot–Watt University; 1997 Technical Digest Series, vol. 16; pp. 36–30.

Meltz et al., Formation of Bragg Gratings in Optical Fibers by a Transverse Holographic Method, 1989 Optical Society of America, pp. 823–825.

James S. Sirkis, Unified Approach to Phase–Strain–Temperature Models for Smart Structure Interferometric Optical Fiber Sensor: Part 1, Development, Optical Engineering, Apr. 1993, pp. 752–761.

* cited by examiner

Primary Examiner—Robert H. Kim
Assistant Examiner—Michael H Caley
(74) Attorney, Agent, or Firm—Dykema Gossett PLLC (57) ABSTRACT

A fiber optic sensor flatpack capable of extremely sensitive strain measurements, without the complexity, high installation costs, and sensitivity to extraneous effects associated with conventional strain gage technologies, such as resistance foil strain gages. The "flatpack" strain sensor houses two individual sensors to allow for accurate temperature compensated strain measurements. The packaging method incorporates plastic materials and laminate manufacturing techniques, which results in a fully hermetic package that is resistant to harsh environmental conditions. Multiple flatpacks can be connected in series and interrogated along a single optical fiber cable when the flatpacks are constructed with fiber optic sensors that can be serially multiplexed, such as with Bragg grating sensors.

29 Claims, 5 Drawing Sheets

FIBER OPTIC STRAIN SENSOR

CROSS-REFERENCE TO RELATED APPLICATION

This application incorporates and claims priority to U.S. Provisional Application No. 60/221,208, filed Jul. 27, 2000, by P. C. Chen et al., entitled FIBER OPTIC STRAIN SENSOR.

BACKGROUND OF THE INVENTION

A number of strain sensor technologies exist that apply to a wide variety of commercial, military, and industrial markets. Resistance strain gages have been the most widely used in the past, and are the most readily available technology at this time. A variety of configurations are available, including those with limited temperature compensation and endurance to harsh environments. However, the inherent disadvantages of resistance strain gages, including installation costs, complexity, weight, long-term measurement drift, susceptibility to electromagnetic noise, and dangers from electrical power requirements, have limited their application in certain fields.

More recently, a new variety of strain sensors have been developed based on fiber optic technology, such as extrinsic Fabry-Perots, in-line fiber etalons, intrinsic Fabry-Perots and Bragg gratings. All of these optical sensors share a common property in which imposed strains on the respective sensor portion of optical fibers alter the transmitted electromagnetic spectrum in a manner that can be detected and measured by optical interrogation instrumentation. This optical sensor technology has overcome many of the difficulties inherent in resistance strain gages and electrical transmission networks. Among the many advantages are:

Accuracy: Optical sensors are self-referencing, with virtually unlimited resolution. This means that measurements are absolute, providing long-term stability that does not require frequent sensor calibration or bridge balancing as required with resistance gage technology. In addition, because these sensors are optical in nature, they do not emit electromagnetic noise and are themselves not susceptible to electromagnetic interference from other electrical systems.

Safety: Optical fiber sensors cannot generate sparks or other forms of heat that might cause unwanted fires or explosions in the presence of fuels or other combustible sources.

Reliability: The mechanical strength of optical fibers has been found to approach three times that of the strongest carbon steel. Hermetic coated fibers are immune to corrosion and do not induce corrosion on metals. In addition, environmental tests conducted to date suggest that temperature and humidity have limited influence of the optical characteristics of Bragg gratings.

Weight and Space Savings: Compared with copper wires used in conventional sensing systems, optical fibers are four times lighter per unit volume and provide greater than ten thousand times more signal bandwidth in a smaller cross section.

Within the past two decades, a number of manufacturers have attempted to exploit this fiber optic sensor technology, with limited results. The costs associated with the electronic and optical systems required to interrogate the fiber optic sensors were prohibitively high for most applications. Application of fiber optic technology to the growing telecommunications industry has greatly mitigated this problem. The drive to multiplex as many communications channels within a single data path as possible has revolutionized the telecommunications industry, and further developments are expected to increase multiplexing capability by orders of magnitude in the future. This will be accompanied by constant improvements in the performance and reliability of optical fiber components, while at the same time, reducing costs. This multiplexing capability will for the first time allow for a high density of strain sensors to be implemented in a single optical network, thus permitting a large distributed sensing capability as required by such emerging areas as the structural health monitoring field.

A key characteristic that has limited the application of fiber optic strain sensors is their inherent sensitivity to temperature variations. This sensitivity makes measurements due to thermal variations indistinguishable from mechanical strain measurements. The temperature sensitivity of fiber optic sensors will continue to limit their application to most fields, unless additional means are implemented to compensate for temperature variations. Some applications of fiber optic strain sensors have solved this temperature dependence problem, such as by the use of Fabry-Perot sensors to decouple the temperature dependent characteristic of optical fibers. However, in most cases, this is achieved at the sacrifice of multiplexing capability.

The present invention provides for temperature compensation and multiplexing capability in a single robust, hermetic sensor package. The present fiber optic sensor "flatpack" houses and protects two fiber optic sensors in a single pre-packaged unit, which compensates for temperature. The present flatpack simplifies the installation of sensors by field personnel by exploiting the adhesives and installation techniques used with well-established resistance strain gage technology.

The present fiber optic sensor flatpack is applicable to a diverse range of applications in defense, civil infrastructure, and industrial applications. For example, in the defense area, the technology is applicable to service life extension programs of ships and submarines. In the civil infrastructure area, the technology is applicable to monitoring the condition of bridges, dams, and highways. In the industrial area, the technology is applicable to various uses in production facilities, transportation, construction, aerospace or wherever structural integrity must be monitored.

The present fiber optic sensor flatpack relies on a number of technologies, as described below.

For example, fiber Bragg gratings (FBG) recently were developed as narrow band optical filters for the telecommunications industry, enabling the transmission of a large number of telephone calls on the same optical fiber link. This is made possible with wavelength division multiplexing (WDM) using FBGs or equivalent spectral filtering technology. This WDM capability can be combined with conventional time and spatial division multiplexing schemes, based on optical switching technology, to enable literally hundreds of sensors to be multiplexed and decoded using the same hardware used to decode just a few sensors.

Figure 1:
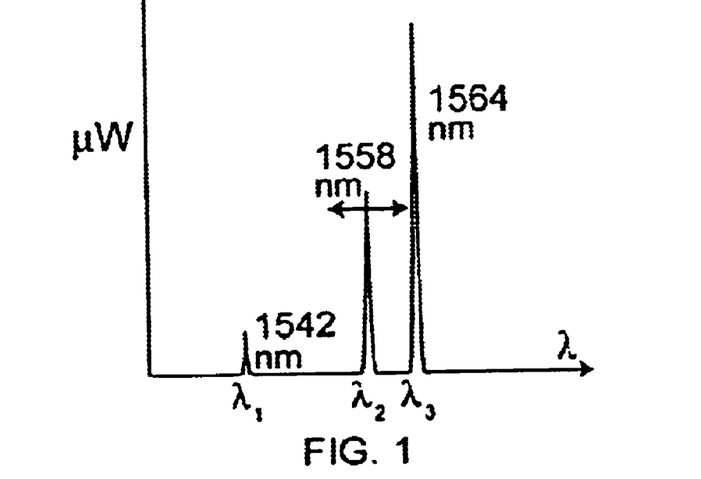
FIG. 1 is a graphical view of optical encoding frequencies.

FBGs are fabricated by exposing a germanium doped or boron co-doped optical fiber to a periodic intensity distribution, as shown in FIG. 1. These fibers are photosensitive, in that the refractive indices thereof change when exposed to ultraviolet (UV) light. Because of this photosensitivity, the impinging sinusoidal intensity distribution results in a sinusoidal refractive index distribution in the fiber core. The combined effect of the periodic index distribution is the reflection of light at a very specific wavelength known as the "Bragg wavelength." This wavelength is predictable in terms of the mean refractive index n and the pitch of the periodicity $\Lambda$ given by $\lambda_B=2n\Lambda$.

Sensors are made from these FBGs by exploiting the characteristic that the grating pitch and refractive index are both functionally dependent on strain. Therefore, strain on and temperature of the grating causes the Bragg wavelength to shift left or right. The wavelength-encoded nature of FBGs offers the greatest potential for multiplexing these sensors in the wavelength domain along a single length of optical fiber.

Multiplexing is accomplished by producing an optical fiber with a sequence of spatially separated FBGs, each having a different pitch $\Lambda_k$, where k=1, 2, 3, . . . , N. The resulting Bragg wavelengths associated with each pitch therefore are given by $\lambda_{Bk}=2n\Lambda_k$, where k=1, 2, 3, . . . , N. Because the unstrained Bragg wavelength of each FBG is different, the information from each sensor is individually determined by examining the wavelength spectrum. For example, where a strain field is uniquely encoded as a perturbation to Bragg wavelength $\lambda_{B2}$, at 1558 nanometers, the Bragg wavelengths associated with the other two gratings $\lambda_{B1}$ and $\lambda_{B3}$ remain unchanged.

Because both the grating pitch A and refractive index n change with temperature, the Bragg wavelength of a FBG shifts with the temperature by approximately 8 pm/° C. This behavior makes the FBG a temperature sensor. No matter which measurand the FBG is adapted to detect, the output requires temperature compensation.

The phase mask method of FBG fabrication is an efficient, but costly method of sensor production. A discrete phase mask is required at each Bragg wavelength desired, each mask currently costing about $2,500. Due to the scale or number of sensors of typical installations, up to 40 phase masks may be required for Bragg grating fabrication, thus elevating costs prohibitively high. Consequently, the interferometric production method currently is the most efficacious sensor manufacturing method used today.

The primary advantage of interferometric sensor production over phase mask production is flexibility. A single setup can be reconfigured and adapted to produce FBGs at any desired Bragg wavelength with no material costs. A disadvantage is that setup tuning requires substantial skill and time.

The present invention exploits a process of writing two closely-spaced FBG sensors on a single fiber. This process allows for the packaging of two FBG sensors within the constraints of a flatpack sensor assembly. A key advantage to developing the present flatpack sensor packaging is that low reflectivity FBGs, on the order of 4 to 8%, can be used. This means that single shot FBGs can be written while the fiber is being manufactured. This process enables hundreds to thousands of FBGs to be written per hour at cost of a few cents per FBG.

Many competing FBG interrogation technologies exist. One commercially available FBG interrogation system relies on what is referred to as the Scanning Fabry-Perot (SFP) method. This method is suitable for DC to low frequency strain measurements. Another approach is based on an interferometric system, for high frequency strain measurements.

Figure 2:
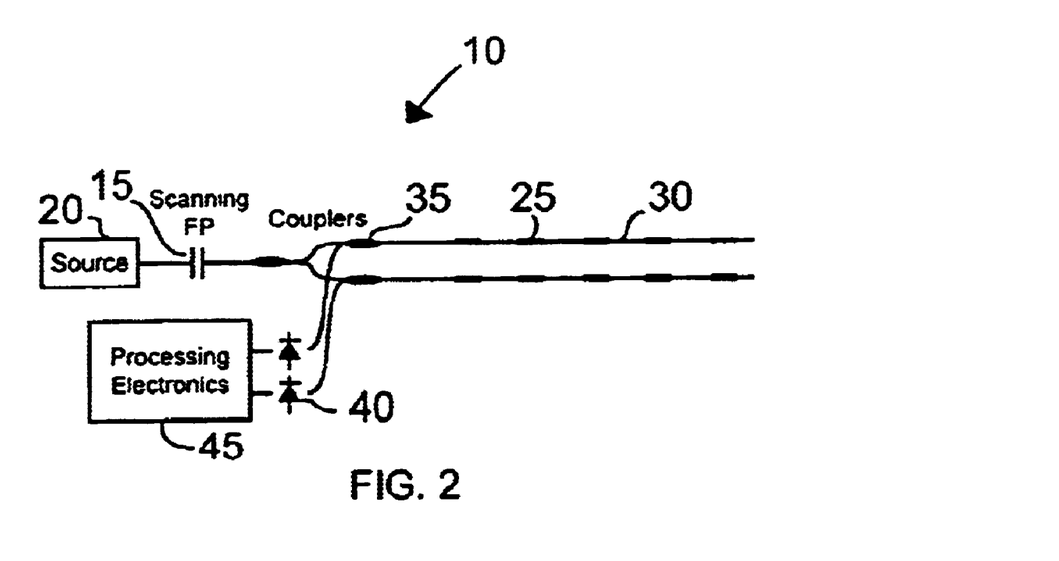
FIG. 2 is a schematic view of a scanning Fabry-Perot optical fiber system.

Referring to FIG. 2, scanning Fabry-Perot (SFP) device 15 includes two highly reflective parallel mirrors. The reflection between the two mirrors produces an optical spectrum filtering effect, which allows a narrow band of optical energy centered at a designed wavelength to pass through. SFP device 15 sweeps the spectrum position of the passing band over a certain wavelength range. Scanning is achieved by mechanically moving one of the mirrors back and forth over a short distance (less than 1 pm) using a stacked piezo-electric actuator (not shown). The voltage that drives the actuator is used as a reference of the center wavelength of the passing band. Because the relationship between the driving voltage and the spectral position of the passing band is normally nonlinear, a real-time calibration mechanism (not shown) is required to ensure scanning accuracy.

Figure 3:
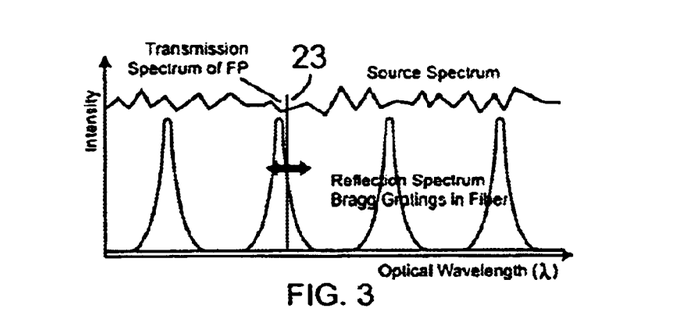
FIG. 3 is a graphical view of a source transmission spectrum and fiber reflection spectra of the system of FIG. 2.

As shown in FIG. 3, the scanning range of SFP device 15 is equal to the bandwidth of the broadband optical source 20. The spectral width of the SFP passing band is much smaller than that of the FBGs in the system. Thus, when SFP device 15 scans through a full range 23, the combined reflective spectrum of Bragg gratings 25 along the fiber 30 can be constructed in a slice-by-slice fashion. The central wavelength of each grating 25 can be obtained, which permits monitoring of strain or temperature. By positioning SFP device 15 immediately after source 20, as shown in FIG. 2, multiple fibers 30 can be interrogated simultaneously.

For clarity, only two fibers 30 containing sensors 25 are shown in FIG. 2. More fibers can be accommodated in the system by adding more fiber couplers 35 and detectors 40 coupled to a processor 45, as long as there is sufficient optical power for each fiber 30. The central Bragg wavelengths of each of the FBGs along the same fiber should be diverse, while the Bragg wavelengths in different fibers can be the same.

Figure 4:
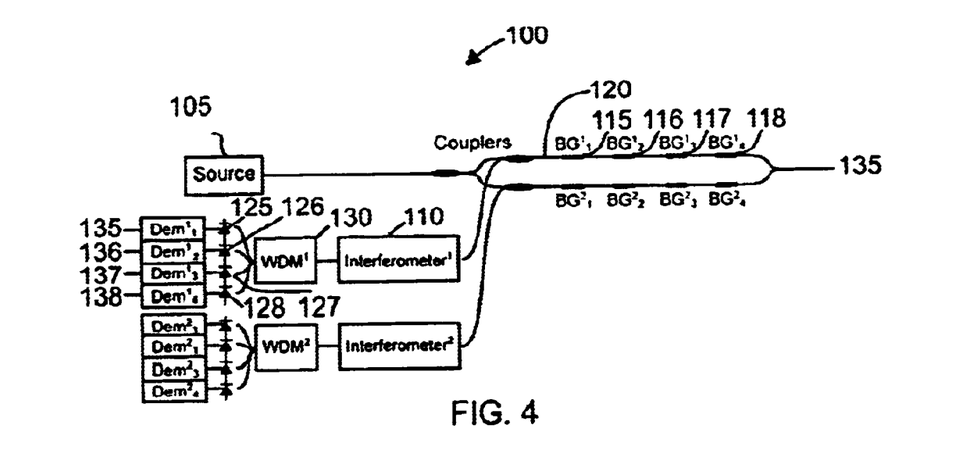
FIG. 4 is a schematic view of an interferometric optical fiber system.

In an interferometer based system 100, as shown in FIG. 4, light from a broad band source 105 passes through an interferometer 110 before illuminating FBGs 115, 116, 117, 118 in a sensing fiber 120. Again, central Bragg wavelengths along the same fiber must be different, but can be the same in different fibers. Light reflected from each of the FBGs 115–118 in each fiber is separated into different detection channels 125, 126, 127, 129 by a wavelength division multiplexer (WDM) 130. Through such an arrangement, one FBG 115, for example, has an associated detector 125, which measures only light reflected from the FBG 115.

In interferometer 100, the input light is split into two different optical paths and then recombined at the output 135. The intensity at the output port can be expressed as I=a+b cos$\phi$, where a and b are constants and $\phi$ is the phase difference of light in the two paths. This phase difference can be expressed as $\phi=2\pi$ nL/$\lambda$, where $\lambda$ is the wavelength of the relevant light passing through interferometer and received by detectors 125–128.

In this system, $\lambda$ is the Bragg wavelength of an FBG 115–118 associated with a respective detector 125–128, n is the refractive index of the two paths and L is the difference in optical path length therebetween. When n and L are constant, a change in $\lambda$ leads to a corresponding change in phase $\phi$, which in turn produces a variation in output intensity. This intensity change is detected electronically and, through the use of an appropriate demodulation circuit, the corresponding change in the wavelength can be obtained.

Only two fiber channels are shown in FIG. 4 for clarity. More fiber channels 120 can be added to a system if there is sufficient optical power in source 105. However, each fiber 120 requires a designated interferometer 110 and WDM 130. Each FBG 115–118 requires a dedicated detector 125–128 and dedicated demodulation circuitry 135, 136, 137, 138. The Bragg wavelengths of each FBG 115–118 along the same fiber must be different and evenly distributed in accordance with the spectrum spacing of the wavelength channels in the WDM 130. The number of spectrum channels in the WDM 130 should be no less than the number of FBGs 115–118 along each fiber 120.

Due to the periodical nature of the interferometric signal, this method is only capable of tracking the relative change in Bragg wavelength, not absolute value. Thus, an interferometer based sensor system is best suited for detecting fast changing strain signals not measuring static strain value.

Although only scanning Fabry-Perot and interferometer interrogation systems are shown, other interrogation systems also may employ the flatpack of the present invention.

SUMMARY OF THE INVENTION

The most important consideration to the design of a robust fiber optic sensor package is an adequate method of decoupling the thermal characteristic of fiber Bragg gratings (FBG). Although individual FBGs provide superior sensitivity to strain measurements, they are nevertheless susceptible to the same temperature effects as conventional resistance strain gage technology and an additional thermo-optic effect. This can be seen from the following thermo-mechanical relationship for FBGs:

$$\Delta\lambda/\lambda = (1-P_e)(\epsilon + \alpha_f \Delta T) = \xi \Delta T$$

where:
$\lambda$=Bragg wavelength;
$\Delta\lambda$=strained wavelength shift;
$P_e$=strain optic coefficient;
$\xi$=thermo-optic coefficient;
$\alpha_f$=thermal expansion coefficient of fiber;
$\Delta T$=temperature change; and
$\epsilon$=mechanical strain.

The thermal sensitivity of FBGs makes FBGs good temperature sensors. However, for accurate measurement of mechanical strain, FBG output requires temperature compensation.

The Bragg wavelength of an FBG shifts with the temperature by approximately 8 pm/° C. due to thermo-mechanical strain and approximately 30 pm/° C. due to the thermo-optic effect.

Decoupling the effects of temperature is possible by incorporating two FBGs, one rigidly fixed relative to the structure being tested, responsive to both thermal and mechanical fields (tight FBG hereinafter), and another mechanically independent and sensitive only to the temperature of the host structure (loose FBG hereinafter). Wavelength changes in the tight and loose FBGs respectively are calculated by:

$$\Delta\lambda_t/\lambda_t = (1-P_e)(\epsilon + (\alpha_s - \alpha_f)\Delta T) + \xi \Delta T$$

$$\Delta\lambda_1/\lambda_1 = (1-P_e)\alpha_f \Delta T + \xi \Delta T$$

where:
$\lambda_t$=wavelength of the tight grating;
$\lambda_1$=wavelength of the loose grating; and
$\alpha_s$=thermal expansion coefficient of host specimen material.

The loose FBG also may be rigidly attached to a predetermined carrier block or substrate. However, the loose FBG must be isolated from mechanical strains occurring on the host material to be able to decouple the temperature dependence of the governing equation. Computer processing measured data from both FBGs also can isolate the purely mechanical strains once the sensor combination has been calibrated.

Another consideration in sensor design is the capability of multiplexing numerous sensors along a single optical fiber cable. As stated earlier, this provides significant advantages in terms of flexibility, cost, and weight savings. The most prevalent method of mounting the loose FBG is to have one end of the loose FBG be severed and free, which precludes any multiplexing capability. The invention overcomes this with a ruggedized fiber optic sensor package that houses and protects both FBG sensors while providing multiplex capability, and that also facilitates installation of the sensors by field personnel.

To understand the unique applications available for the present fiber optic sensor flatpack, it is useful to understand current resistance strain gage manufacturing methods and applications. Resistance strain gages typically consist of an etched constantan alloy grid layer embedded on a thin polyimide backing, such as Kapton. The backing carries the strain sensitive constantan layer and provides electrical insulation. The geometry of the polyimide backing and adhesive layer used to bond the gage to a specimen is a critical performance characteristic.

Figure 5A:
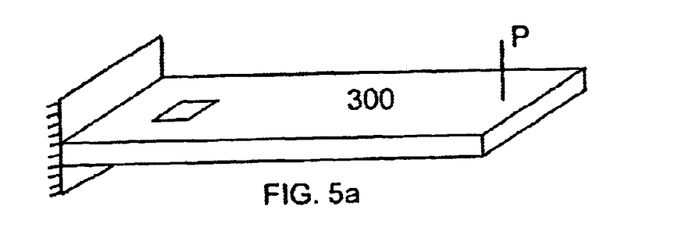
FIGS. 5a and 5b respectively are a top, right, front perspective view and an end view of a beam having a strain gage mounted thereon.

A typical application of resistance strain gages involves the measurement of surface strains occurring on cantilever mounted beam specimens. Referring to FIG. 5a, from beam theory, a cantilever beam 300 has a unique radius of curvature R at the neutral axis, described by:

$$R = EI/M = c/\epsilon_s$$

where:
E=elastic modulus;
I=area moment of inertia;
M=moment;
c=distance from neutral axis to surface; and
$\epsilon_s$=strain at surface.

Figure 5B:
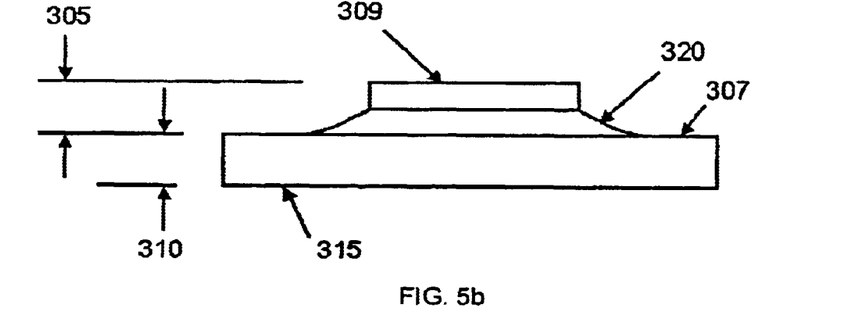

As seen in FIG. 5b, a distance 305 from the neutral axis 307 of the beam 300 to a gage grid 309 is greater than a distance 310 from neutral axis 307 to the beam surface 315 by the thickness of the gage backing (not shown) and an adhesive layer 320, the difference being referred to herein as "offset distance." The magnitude of the strain produced on the surface of a cantilever beam specimen normally is lower than that in the typically copper gage grid during bending, described by:

$$\epsilon_g/\epsilon_s = t + 2t_{g+a}/t$$

where:
$\epsilon_g$=strain at gage;
t=thickness of beam; and
$t_{g+a}$=thickness of backing and adhesive.

Errors associated with the offset distance can be quite significant for a thin beam or membrane. Thus, strain sensors that require high profile packaging are very susceptible to measurement errors associated with this offset distance. Most conventional resistance strain gages minimize this error by incorporating very thin plastic backing layers.

The present flatpack minimizes the offset error by incorporating thin polyimide laminate materials, yielding a strain transmission accuracy on the order of that obtainable using the most sensitive resistance strain gages.

Typically, a sensor configuration is selected such that it will not fail before the host material. This is to assure data acquisition after the host material undergoes plastic deformation and begins to approach its ultimate strain before fracture.

Non-reinforced polyimide film backing layers of conventional resistance strain gage can withstand up to 20% elongation before fracture. In comparison, the ultimate strain of typical communications grade optical fiber is 5% elongation, comparable to typical resistance strain gages, yet should be adequate for strains well within the plastic region of most host materials.

Endurance to temperature variations also is an important consideration. Although thermoplastics typically cannot withstand the same high temperatures as metals, they are nevertheless extremely durable. Polyimide can retain a modulus of elasticity up to 260° C. (500° F.). Polyimide also has dimensional stability and creep resistance, even at high temperatures and under extreme loads, that are among the best of the thermoplastics.

Resistance strain gages are selected to match the thermal expansion coefficient of the host material for achieving the most accurate strain measurements. This is achieved by selecting various combinations of backing and sensor grid materials in the manufacture of the resistance strain gage. In addition, large differences in thermal coefficients of expansion for the grid, backing, specimen materials and the adhesive could cause large shear stresses to be generated which could cause eventual shearing of the sensor from the specimen. The selection criteria of an appropriate resistance strain gage and adhesive for a particular application thus is an involved process.

Another critical consideration is to achieve accurate transmission of thermal fields to the FBGs. This requires that the carrier be as thermally conductive as possible. Unlike metals, most thermoplastics are poor heat conductors. However, the thermal insulating qualities of thermoplastics are negligible provided they are as thin as possible. The best configuration is one that allows the FBGs to contact or be as close as possible to the specimen to be measured.

Corrosion is a very complex phenomenon, and is inevitable in most sensor designs incorporating ferrous materials. Furthermore, corrosion is sometimes impossible to characterize, since even small changes in temperature, solution concentrations, or stray electric currents can drastically change corrosive rates. In particular, galvanic corrosion is commonly found with weldable resistance strain gages, where adjoining carrier and host structures consist of dissimilar metals. Although thermoplastic materials may appear to be less susceptible to this phenomenon, they may allow corrosive elements to permeate through to components that are sensitive to effects such as stress corrosion cracking. Copper alloys typically have lower fatigue limits than either steels or plastics. Thus, polyimide films seem to be advantageous even in high fatigue and chemical environments.

The present flatpack may have a polyamide substrate, which may be adhered to a host structure, or a metal substrate, which may be welded to the host structure. Adhering the present flatpack to a host structure requires consideration of many factors. Current lifespan projections, according to limited data, indicate that the adhesive is the limiting value to operational longevity of resistance strain gages, which is approximately two years with conventional adhesives. Weldable strain gages commonly are selected for use in harsh environments. However, welding is less favorable than conventional adhesives, based on field implementation issues as well as corrosive effects. Nevertheless, even with existing weldable strain gages, environmentally resistant adhesives to secure resistance strain gages to weldable steel carriers is preferred.

Hot curing adhesives also are commonly used to mount strain gages. However, high residual compression strains can occur when the specimens are allowed to cool after the adhesive is heat cured at elevated temperatures. Of commercially available adhesives, two-part, room temperature curing epoxy adhesives, such as Micro-Measurements AE-10, seem to be the most promising. The environmental endurance of epoxy adhesives also is applicable to fiber optic sensors.

In view of the above, the invention provides a strain sensor including a fiber having a first grating and a second grating wherein, when the strain sensor defines an unstrained configuration, the first grating is in tension and the second grating is not in tension. The invention also provides a method of measuring strain with an optical fiber by transferring stress to a first grating in the fiber, isolating a second grating in the fiber from the stress and modifying a strain value obtained from the first grating by a second apparent strain value obtained from the second grating.

Other features and advantages of the present invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

Figure 6:
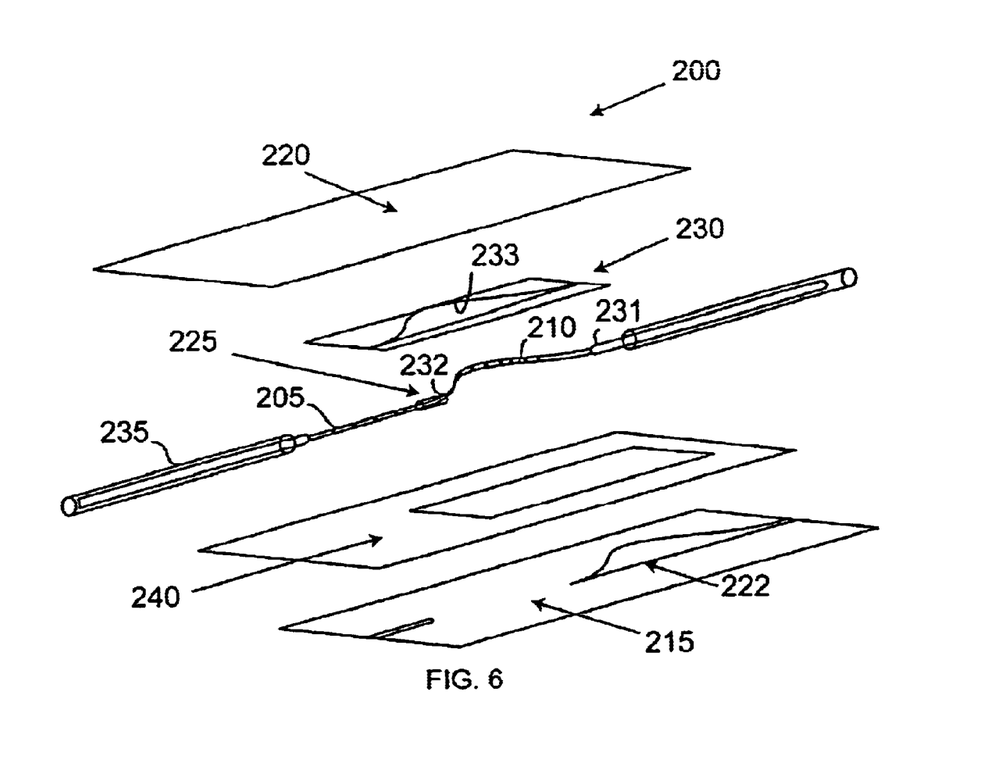
FIG. 6 is a strain sensor according to principles of the invention.

FIG. 6 shows the present fiber optic strain sensor flatpack 200. Flatpack 200 includes two FBG sensors 205 and 210 laminated between a thin carrier 215 and a top cover layer 220. Carrier 215 may be constructed from polyamide or a metal. Tight FBG 205 measures strains due to varying thermo-mechanical fields, while loose FBG 210 decouples the thermal characteristic from the strain measurements. FBG 205 and FBG 210 may exist in separate, optically coupled fibers, or coexist in a single fiber.

Carrier 215 has etched grooves 222 to provide partial isolation with respect to loose FBG 210, as well as to simplify alignment of the optical fiber 225 during flatpack fabrication. The determination of an appropriate etched groove is described in greater detail below.

Loose FBG 210 is further retained in an etched plate 230, constrained at both ends 231, 232, but free within a passage 233 of plate 230. Passage 233, preferably corresponds to, or bounds, grooves 222. Preferably, plate 230 is constructed from brass. Passage 233 allows FBG 210 to expand and contract with temperature variations, but to remain isolated from mechanical strains occurring on the host material and carrier interface. FBG sensors 205 and 210 are written as close as possible without overlapping along optical fiber 225 so that both can fit in a single package. A furcation tubing 235 provides additional protection of optical fiber 225 at the edges of carrier 215.

Adhering cover 220, FBGs 205, 210 and furcation tubing 235 may be achieved using conventional heat and pressure activated acrylic and epoxy adhesive films. Considerations for determining the best adhesive process are detailed below. Additional etching, chemical or mechanical, on the entire interfacing surface of carrier 215, increases laminate integrity and bond strength at the host structure interface for better transmission of surface strains to restrained FBG 205.

Normally, the protective coating on the pristine optical fiber is stripped as part of the FBG writing process. The fiber then must be recoated for environmental protection, typically with proprietary acrylate or polyimide materials. The recoating material and process causes widely varying thermo-mechanical fiber properties. The invention avoids the expense and difficulties caused by recoating because the fiber length along FBG 210 can be left uncoated, yet sealed from the environment by the plate 230 and laminate combination. Tight FBG 205 used to measure mechanical strains also is left uncoated, but does not require any additional protection since, such being provided by an adhesive 240 and laminates that fully encapsulate the package. These measures guarantee consistency among flatpacks 200 so that a single set of calibrated sensor factors can be used in all flatpack sensors.

A distinct advantage to using brass for retaining plate 230 is that the ductility of the material allows for the eventual incorporation of other features in the package. This includes features such as crimp leads for retaining the FBG endpoints or furcation tubing. Plate 230 may be reconfigured with an integral rolled tab, rather than enclosing loose FBG 210 with a plate-laminate combination. However, the ductile properties also can be considered a liability, in that excessive bending during handling and installation may result in permanent deformations of flatpack 200.

The invention provides a simplified and consistent fabrication process, using only one adhesive layer 240 and cover film 220. As the cover film encapsulates the entire flatpack 200 package, no further measures are needed to protect the FBGs 205, 210 from detrimental environmental effects. Plate 230 and surrounding plastic laminates protect FBGs 205, 210 against high humidity, brackish environments, chemical contaminants, etc., as well as damage from external forces and abrasion. However, due to the permeable nature of thin polyimide films, flatpacks 200 constructed in this manner may degrade over appreciable durations. Other non-proprietary and proprietary films, such as Teflon-coated Kapton, also may be used.

As with most strain sensor technologies, the sensor footprint is the first design consideration, which affects how strain data should be interpreted. Measured strains reflect average strains occurring under the sensor area. Thus it is advantageous to reduce the size of the sensor and corresponding bond area as much as possible, to approach ideal point-strain measurements. Larger bond areas also increase the risk of non-uniform and fluctuating stress transfers along the adhesive region which leads to eventual bond failure. Since conventional FBG manufacturing processes limit the FBG lengths to approximately 1.0 cm (0.39 in), the minimum overall length of all the flatpack sensor preferably is at 3.85 cm (1.50 in) to accommodate two FBGs. The width limit preferably is 1.27 cm (0.50 in) to allow for adequate bond area and to facilitate packaging.

As mentioned above, carrier 215 has grooves 222 etched therein. Straight etched grooves provide inadequate strain relief in loose FBG 210. As flatpack 200 is mechanically strained, the FBG 210 experiences some residual strains. Even where a groove 222 is approximately 3 times as wide as fiber 225 so as to provide some strain relief to FBG 210, it is difficult to avoid pretension in grating 210 while aligning fiber 225 in the groove 220 and affixing both ends during fabrication. Without adequate strain relief, the FBG 210 experiences relief of the pretension as well as fiber buckling stresses, thus resulting in misleading strain measurements.

To avoid this problem, FBG 210 is assembled in a bent curve, thereby defining a post-buckled configuration, as shown in FIG. 6. As flatpack 200 is subjected to mechanical strains, additional bending or relief of fiber 225 would occur without axial strain. Although fiber stretching and bending both produce mechanical stresses in fiber 225, the inherent nature of FBGs and their characteristic wavelength shifts make them sensitive only to axial strains and immune to bending strains, provided certain assumptions are not violated. This occurs in all optical fibers, regardless of manufacturer. Flatpack 200 exploits this inherent property.

As one end of a fiber is displaced axially, the pretension in the fiber is relieved, until further displacement only results in lateral bending of the fiber. This occurs after a strain of approximately 2300 $\mu\epsilon$ on average. No wavelength shifts are measured within this strain range after relief of the pretension, since the actual length (equivalent arc-length) of the fiber between the fixed end and translated end remains constant. However, larger displacements, on the order of 35400 $\mu\epsilon$, result in optical losses due to excessive bending of the fiber. Thus, the upper threshold of strain is not governed by measured wavelength shifts, but by excessive optical losses. This becomes a problem if a number of flatpacks 200 eventually are multiplexed along a single fiber optic cable.

Figure 7A:
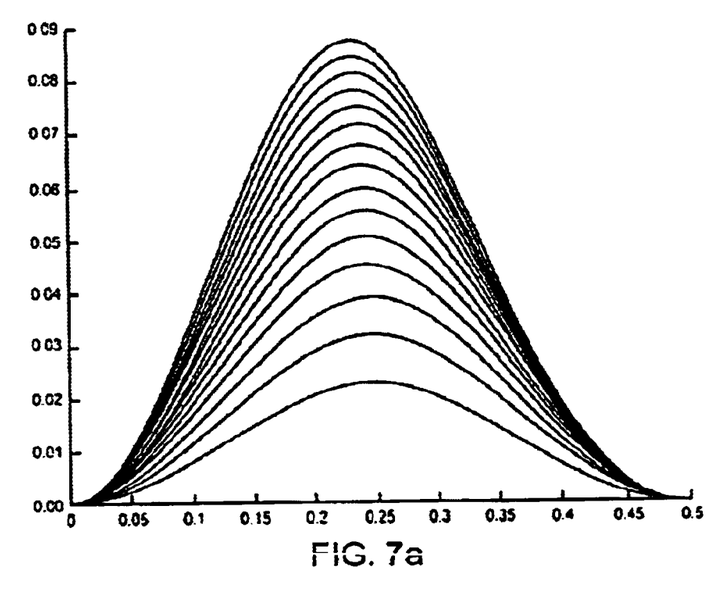
FIGS. 7a and 7b respectively are graphical views of strain profiles for optical fibers.
Figure 7B:
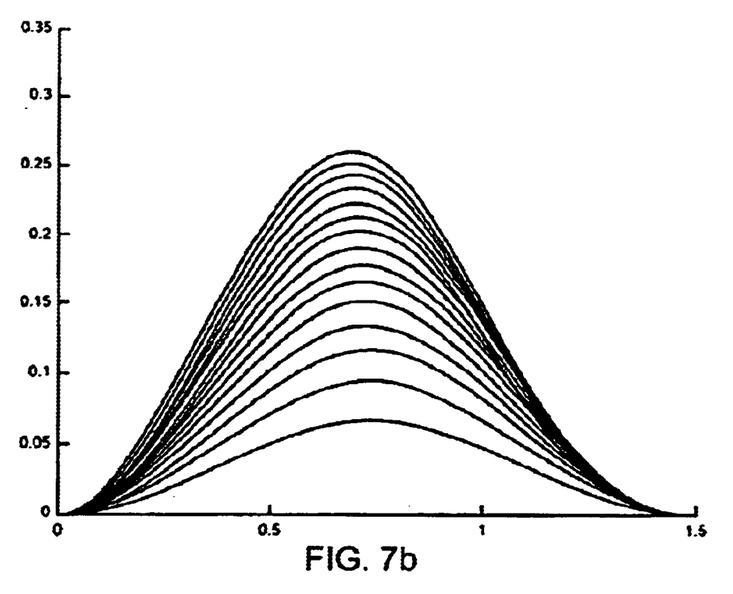

Fiber curve profiles resulting from imposed strains are difficult to measure empirically. Thus, a model based on a third-order polynomial function with appropriate boundary conditions is used to derive equivalent curve profiles, as shown in FIGS. 7(a) and (b), which represent 1.27 cm (0.50 in) and 3.81 cm (1.5 in) strain relief regions, respectively. Each of the curves of FIGS. 7(a) and 7(b) represent an equivalent increment of axial displacement (5000 $\mu\epsilon$). As axial displacements are imposed, lateral deflections from fiber bending are most pronounced when the fiber is nearer to the straight-line (unstrained) condition.

Figure 8:
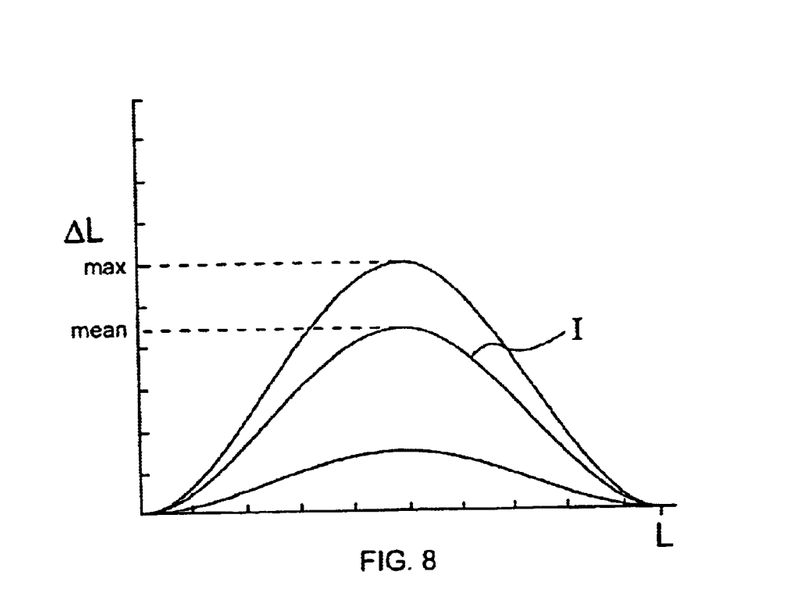
FIG. 8 is a graphical view of strain relief boundaries for an optical fiber.

FIG. 8 shows the minimum and maximum curve profiles for a strain relief region. The ideal curve I provides for detection of strain equally in tension and compression.

Increasing the length of a strain relief region allows for greater strains to be imposed without subjecting the loose grating to wavelength shifts or optical losses. Although long strain relief regions that have greater ranges may be reasonable for an application, the increased length has an additional benefit. For example, manufacturing tolerances are greater for longer gage lengths. This is especially beneficial for prototype construction where the sensors are manufactured by hand on non-etched carriers. However, longer strain relief regions require wider etched grooves, thus making a loose FBG more susceptible to internal friction and external forces transmitted through the thin protective top cover layer. For production flatpacks 200, more accurate processes using jigs and locating fixtures can be developed to minimize etched groove size.

Thus, by exploiting the use of precision manufacturing equipment, the maximum curve profile need not be that at which optical losses become apparent. To minimize the width of the etched groove, the upper bounded curve may be that at which maximum strain is expected. For example, for a strain range of +/−1000 $\mu\epsilon$ (plus an excess factor of 2.0), and a manufacturing tolerance of +/−10 micrometers (equivalent to +/−788 $\mu\epsilon$ for a 1.27 cm (0.50 in) strain relief region), the upper bounded curve need only be offset 5575 $\mu\epsilon$ from the lower bounded curve. Internal friction will remain the most problematic issue to resolve for optimum accuracy.

Another problem with flatpack construction is adhesive flow along the length of the fiber and etched groove, due to capillary action and the difficulty of controlling and dispensing adhesive over the areas to be secured, as well as during installation of the unprotected flatpacks on specimens. One technique provides for assembling flatpacks with AE-10 two-part epoxy from Micro-Measurements, Inc. However, the cure rate of these adhesives is very dependent on ambient temperature and other environmental conditions. Before curing, AE-10 has very low resistance to flow, which makes flatpack manufacturing very inconsistent, especially when adhesive flow over the loose Bragg grating renders the finished package unusable.

Another embodiment of the invention corresponds generally to flatpack 200 as shown in FIG. 6 and described above, but including only tight FBG 205 and not loose FBG 210 or other temperature decoupling mechanism. A flatpack constructed according to this embodiment provides a sensor that is readily attachable to a host structure. This eliminates difficulties encountered through mounting fiber gratings directly onto host structures.

Another method of flatpack manufacture incorporates pressure sensitive adhesives (PSA). Most PSAs are based on acrylic, silicone, or rubber adhesive layers on a polyimide backing layer. The resulting packages assembled with bare fiber prove very durable, especially when subjected to an elevated "thermosetting" temperature cycles to increase bond strength. However, the resulting bonds are exceedingly susceptible to shear stress, due to the pliable character of the adhesives. This remains an undesirable feature for accurate transmission of strains on the host structure to the restrained FBG sensor within the flatpack.

A further method of manufacture exploits thermal heat sealing production techniques. This sealing technology is well established for unique markets from consumer goods, graphic arts, to space applications. Most materials provide very good bonds to itself, but poor bonds to an optical fiber. Teflon-coated polyimide films provide the best bond strength to the glass optical fiber of an FBG. However, the required temperatures to achieve Teflon bonds are beyond the capabilities of the acrylate polymer coating on the optical fiber. This exposes the fiber to detrimental environmental factors, where full encapsulation and protection of the fiber cannot be achieved. Even where the coating remains intact, it is very brittle after prolonged exposure to elevated temperatures, such that any imposed strains on the fiber result in propagating cracks and eventual failure of the fiber core.

The most efficient manufacturing method involves adhesives used in the manufacture of flexible printed circuit assemblies. These are laminating adhesives that require heat and pressure to form extremely durable bonds. This method provides a number of advantages, including full encapsulation of a flatpack assembly for the greatest protection against the environment, as well as laminate bonds that are stronger than the epoxy bonds used during flatpack installation. Epoxy bonds maintain flatpack integrity and avoid the risk of delamination during high strain cycles.

Flatpacks based on laminate production techniques may be fabricated with modified etched components. These components incorporate etched grooves that follow the curve profiles of FIGS. 7(a) and 7(b). Alternative materials to polyimide (Kapton), such as less-costly polyester films, also may be used.

The flatpack sensor temperature compensated strain data is computed from the raw wavelength data acquired from the two FBGs within a flatpack sensor, by:

$$\epsilon = m_S * \Delta\lambda_S/\lambda_S = m_t * \Delta\lambda_t/\lambda_t$$

where:
$m_S$=strain sensor factor;
$m_t$=temperature sensor factor;
$\lambda_S$=Bragg strain sensor wavelength; and
$\lambda_t$=Bragg temperature sensor wavelength.

Sensor factors are performance characteristics determined before assessment can be made on the accuracy of a particular flatpack sensor. The sensor factors are determined by using a least squares linear regression technique to fit the Bragg grating sensor wavelength raw data (independent variables) to the corresponding STC instrument data (dependent variables), with the following linear statistical model:

$$y = m_S x_S + m_t x_t + b$$

where:
$m_S$=strain sensor factor;
$m_t$=temperature sensor factor;
y=reference strain measurement;
$x_S$=measured shift in strain sensor wavelength, $\Delta\lambda_S/\lambda_S$;
$x_t$=measured shift in temperature sensor wavelength, $\Delta\lambda_t/\lambda_t$; and
b=experimental zero offset.

The sensor factors are unique for each specimen and flatpack sensor combination. For each flatpack sensor design, multiple tests must be conducted, using identical specimen and flatpack sensor combinations, to acquire enough sample data to determine the overall accuracy of a particular flatpack sensor design. The least squares linear regression technique is again used to fit the reference strain readings (independent variable) to the corresponding computed flatpack sensor strain values (dependent variable) with the following linear statistical model:

$$z = m*x + B$$

where:
z=commuted flat-pack sensor strain value, $\epsilon$;
x=reference strain measurement, y;
m=slope of line; and
B=intercept of line on vertical axis.

Once the slope and intercept are computed, using standard statistical analysis tools, the corresponding sample standard deviation can be computed, yielding the accuracy of a particular flatpack design to a selected confidence level.

Although the invention has been described in relation to particular embodiments thereof, many other variations and modifications and other uses will become apparent to those skilled in the art. The invention is not limited by the specific disclosure herein, but only by the appended claims.

We claim:

1. A strain sensor comprising: first and second fiber ends, a first fiber grating and a second fiber grating being proximately located and optically coupled to each other, said first and second gratings being coupled between the first and second fiber ends, wherein when said strain sensor is mechanically strained, said first fiber grating realizes corresponding axial strain and said second fiber grating does not realize corresponding axial strain, said second fiber grating has a first end and a second end, said strain sensor further comprising a plate for constraining movement of said first end and said second end.

2. The strain sensor of claim 1, wherein said first fiber grating and said second fiber grating exist in a single fiber.

3. The strain sensor of claim 1, wherein said second fiber grating realizes thermally-induced strain.

4. The strain sensor of claim 1, further comprising a carrier, said first fiber grating being fixed to said carrier and said second fiber grating being independent of said carrier.

5. The strain sensor of claim 4, wherein said carrier has a groove configured to receive said second fiber grating defining a non-linear configuration.

6. The strain sensor of claim 4, wherein said carrier is constructed from a non-reinforced polyimide laminate or a ductile metal.

7. The strain sensor of claim 1, wherein, when said strain sensor realizes strain, said second fiber grating realizes bending strain.

8. The strain sensor of claim 1, wherein said plate has a first crimp lead for retaining said first end, and a second crimp lead, for retaining said second end.

9. The strain sensor of claim 1, wherein said plate defines a passage for receiving said second fiber grating.

10. The strain sensor of claim 9, wherein said passage is configured to receive said second fiber grating defining a non-linear configuration.

11. The strain sensor of claim 9, further comprising a carrier having a groove for receiving said second fiber grating, wherein said passage corresponds to said groove.

12. The strain sensor of claim 11, wherein said groove is configured to receive said second fiber grating defining a non-linear configuration.

13. The strain sensor of claim 1, further comprising:
a carrier, said first fiber grating being fixed to said carrier and said second fiber grating being independent of said carrier; and
an adhesive disposed between said carrier and said plate.

14. The strain sensor of claim 13, wherein said adhesive is activated by heat and pressure.

15. The strain sensor of claim 1, further comprising:
a carrier, said first fiber grating being fixed to said carrier and said second fiber grating being independent of said carrier; and
a cover disposed on said plate, said first fiber grating, said fiber grating and said carrier.

16. The strain sensor of claim 15, wherein said cover is constructed from a non-reinforced polyimide laminate.

17. The strain sensor of claim 15, further comprising an adhesive adhering said cover, said plate, said first fiber grating, said second fiber grating and said carrier.

18. The strain sensor of claim 1, wherein said plate is constructed from brass or a ductile material.

19. The strain sensor of claim 1, wherein the tension in said first fiber grating is such that said strain sensor is responsive to substantially equivalent amounts of tensile stress and compressive stress.

20. A strain sensor system comprising:
one or more strain sensors including first and second fiber end, a first fiber grating and a second fiber grating being proximately located and optically coupled to each other, said first and second gratings being coupled between the first and second fiber ends;
a light source;
a scanning Fabry-Perot device in optical communication with said light source;
each of said sensors having an input end and an output end, said input end being in optical communication with said scanning Fabry-Perot device;
a detector exclusively dedicated to and in optical communication with the output end of each strain sensor; and
a microprocessor responsive to said detectors,
wherein when said strain sensor is mechanically strained, said first fiber grating realizes corresponding axial strain and said second fiber grating does not realize corresponding axial strain, said second fiber grating has first and second ends, said strain sensor further comprising a plate for constraining movement of said first and second ends.

21. A strain sensor system comprising:
one or more strain sensors including first and second fiber end, a first fiber grating and a second fiber grating being proximately located and optically coupled to each other, said first and second fiber gratings being coupled between the first and second fiber ends;
a light source;
each strain sensor having an input end and an output end, said input end being in optical communication with said light source;
an interferometer exclusively dedicated to and in optical communication with the output end of each strain sensor;
a wavelength division multiplexer dedicated to and in optical communication with each of said interferometers; and
a set of demodulation circuits dedicated to and in optical communication with each of said wavelength division multiplexers, wherein a number of demodulation circuits in each of said sets corresponds to a number of gratings a fiber in optical communication with said wavelength division multiplexer, and wherein when said strain sensor is mechanically strained, said first fiber grating realizes corresponding axial strain and said second fiber grating does not realize corresponding axial strain, said second fiber grating has first and second ends, said strain sensor further comprising a plate for constraining movement of said first and second ends.

22. A strain sensor comprising:
a carrier;
a pair of fiber ends coupled to the carrier;
a first fiber grating fixedly mounted on said carrier; and
a second fiber grating optically coupled to the first fiber grating, being independently mounted on the carrier such that said first fiber grating realizes corresponding axial strain and said second fiber grading does not realize corresponding axial strain, said first and second fiber gratings being coupled between the pair of fiber ends, wherein said second fiber grating has first and second ends, said strain sensor further comprising a plate for constraining movement of said first and second ends.

23. The strain sensor of claim 22, wherein said carrier is constructed from a non-reinforced polyimide laminate or a ductile metal.

24. The strain sensor of claim 22, further comprising a cover mounted on said first and second fiber gratings and said carrier.

25. The strain sensor of claim 24, wherein said cover is constructed from a non-reinforced polyimide laminate.

26. A method of measuring strain, said method comprising:

locating first and second fiber gratings in close proximity and coupling the first and second fiber gratings between fiber ends;

transferring strain to the first fiber grating;

isolating a second fiber grating from the strain; and deriving a strain value from the first fiber grating;

deriving a modification value from the second fiber grating; and modifying the strain value derived from the first fiber grating by the modification value derived from the second fiber grating, wherein said second fiber grating has first and second ends, said strain sensor further comprising a plate for constraining movement of said first and second ends.

27. The method of claim 26, wherein isolating the second fiber grating comprises freeing the second fiber from realizing axial strain.

28. The method of claim 26, wherein the modification value corresponds to temperature-induced stain.

29. The method of claim 26, further comprising connecting the first fiber grating to a host structure with a non-reinforced polyimide laminate.

* * * * *

UNITED STATES PATENT AND TRADEMARK OFFICE
CERTIFICATE OF CORRECTION

PATENT NO. : 6,668,105 B2
DATED : December 23, 2003
INVENTOR(S) : P. Chen It is certified that error appears in the above-identified patent and that said Letters Patent is hereby corrected as shown below:

<u>Title page,</u>
Item [73], Assignee, please add -- The University of Maryland
College Park, MD. (US) --

Signed and Sealed this

Fourteenth Day of December, 2004

JON W. DUDAS
*Director of the United States Patent and Trademark Office*